United States Patent [19]

Flowers et al.

[11] Patent Number: 4,844,322

[45] Date of Patent: Jul. 4, 1989

[54] METHOD FOR REPLACING A SECTION OF TUBING

[75] Inventors: Gilbert E. Flowers, Cincinnati; Earl L. Kelly, Jr., West Chester; Henry E. Lynch, Middletown, all of Ohio

[73] Assignee: General Electric Company, Cincinnati, Ohio

[21] Appl. No.: 108,667

[22] Filed: Oct. 15, 1987

[51] Int. Cl.⁴ .................. B23K 5/207; B23K 31/02; B23K 33/00

[52] U.S. Cl. .................. 228/119; 228/170; 228/175; 228/182; 228/183; 228/205; 228/249; 228/255; 228/902; 29/402.08; 29/402.13; 285/286; 285/287; 285/399

[58] Field of Search .......... 228/119, 170, 175, 176, 228/182, 183, 205, 246, 249, 255, 902; 29/402.08, 402.13; 285/286, 287, 399

[56] References Cited

U.S. PATENT DOCUMENTS

| | | |
|---|---|---|
| 898,860 | 9/1908 | Fitzsimmons . |
| 990,230 | 4/1911 | Cornelius . |
| 1,023,353 | 4/1912 | Anderson . |
| 1,424,189 | 8/1922 | Strobot . |
| 1,889,974 | 12/1932 | Chamberlain .................. 285/287 |
| 2,334,755 | 11/1943 | Eglinton .................. 32/59 |
| 2,407,972 | 9/1946 | Aitchison .................. 158/27.4 |
| 3,028,154 | 4/1962 | Johnson .................. 266/23 |
| 3,168,799 | 2/1965 | Johnson .................. 51/392 |
| 3,188,674 | 6/1965 | Hobbs .................. 15/179 |
| 3,532,010 | 10/1970 | Klintworth . |
| 4,205,493 | 6/1980 | Kim .................. 51/170 T |
| 4,401,040 | 8/1983 | Dobi .................. 110/349 |
| 4,615,477 | 10/1986 | Spada et al. .................. 228/119 |
| 4,678,380 | 7/1987 | Zahuranec et al. .................. 408/211 |
| 4,682,725 | 7/1987 | Martin et al. .................. 228/119 |
| 4,694,549 | 9/1987 | Rabe .................. 29/402.08 |

FOREIGN PATENT DOCUMENTS

| | | | |
|---|---|---|---|
| 0173025 | 6/1985 | European Pat. Off. . | |
| 1115440 | 10/1961 | Fed. Rep. of Germany | 285/286 |
| 1650121 | 9/1970 | Fed. Rep. of Germany | 285/287 |
| 3117834 | 11/1982 | Fed. Rep. of Germany | 285/287 |
| 2126298 | 3/1984 | United Kingdom | 285/287 |

*Primary Examiner*—Nicholas P. Godici
*Assistant Examiner*—Samuel M. Heinrich
*Attorney, Agent, or Firm*—Derek P. Lawrence; Steven J. Rosen

[57] ABSTRACT

A method for replacing a damaged or defective section of a length of original piping or tubing located within a structrue such as the turbine of a jet engine wherein access to the tubing is limited, and replacing such damaged section with a new section of tubing comprises inserting a cutter mounted at one end of a flexible shaft into the interior of the original tubing and rotating the shaft to cut out and remove the damaged section of tubing leaving at least one stub section of original tubing. The stub sections of original tubing are then prepared for welding or brazing to a section of replacement tubing with a series of tools each mounted to an elongated shaft. These tools include a chamfering tool, a deburring tool, and a polishing tool. The replacement section of tubing is connected to the stub section of original tubing by inserting a hollow mounting sleeve welded or brazed to the replacement section of tubing over the end of the stub section so that the end edge of the stub section engages a brazing ring carried in the interior of the hollow mounting sleeve against the end edge of the replacement section of tubing. The elongated nozzle of an acetylene torch is then inserted into the replacement section of tubing and heats the brazing ring to form a fluid-tight joint.

3 Claims, 2 Drawing Sheets

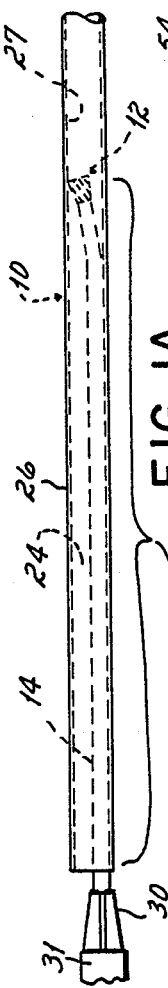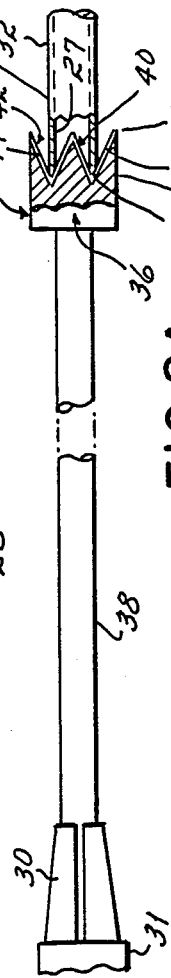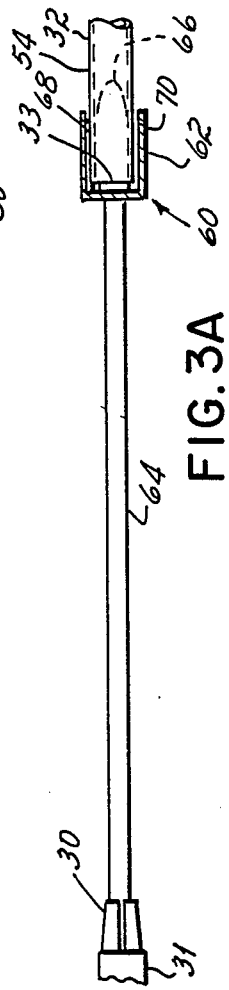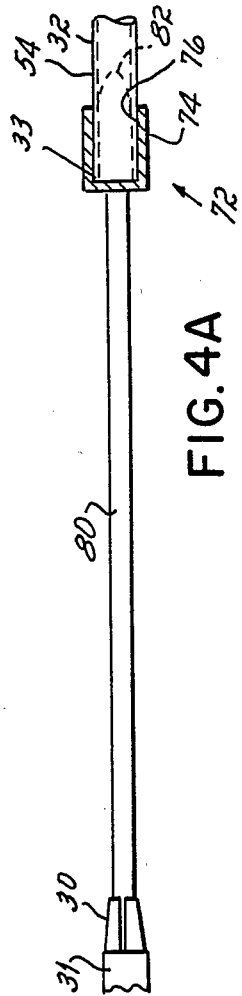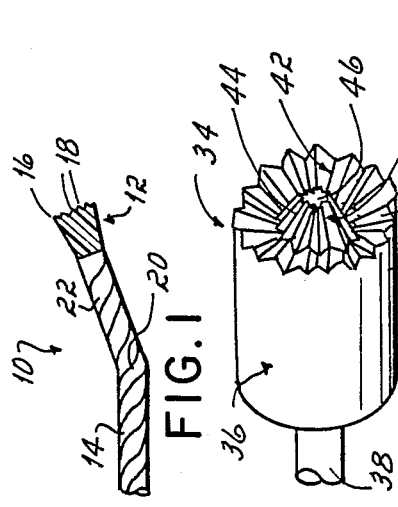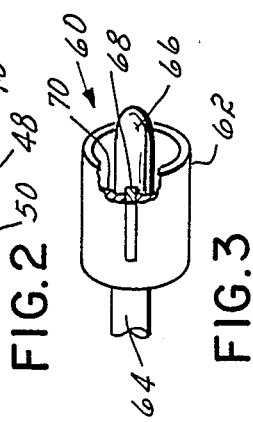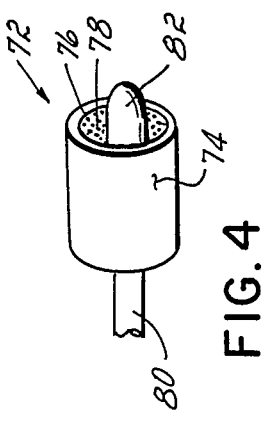

METHOD FOR REPLACING A SECTION OF TUBING

The Government has rights in this invention pursuant to Contract No. F33657-84-C-2011 awarded by the Department of the Air Force.

FIELD OF THE INVENTION

This invention relates to the repair of cylindrical members, and, more particularly, to a method and apparatus for the replacement of a damaged or defective section of piping or tubing located in a structure such as the turbine o a jet engine in which limited space is available to gain access to the tubing for repair or replacement.

BACKGROUND OF THE INVENTION

Hollow cylindrical members such as piping and tubing are used to transmit fluids in a wide variety of applications. In some applications, economic considerations, maintenance time and other factors make it preferable to remove a damaged or defective section of piping or tubing, and replace it with a new section, rather than remove the entire length of tubing involved.

One method of replacing a damaged section of tubing from a length of original tubing involves first cutting the original tubing on either side of the damaged section, removing the damaged section of tubing, deburring and polishing the stub sections of original tubing which remain after the cut and then welding, brazing or otherwise permanently affixing a new, replacement section of tubing to the stub sections of original tubing.

In the prior art, the cutting operation is normally performed with a cutting blade which is positioned in engagement with the outer wall of the tubing and then rotated or moved laterally to cut from the outer surface to the inner surface of the wall of the tubing. This produces two stub sections of original tubing on either side of the damaged section of tubing which is removed. The cut ends of the remaining stub sections of original tubing may have burrs or other surface irregularities as a result of the cutting operation. These are removed by one or more deburring tools having cutting blades or an abrasive surface adapted to contact the end of such stub sections.

Depending upon the type of joint to be made between the replacement section of tubing and the stub sections of original tubing, a chamfering tool may be employed to form a chamfer on the end of each stub section of tubing. A polishing tool is then used to buff or polish the outer wall of each stub section in preparation for the brazing or welding operation in which the new or replacement section of tubing is permanently affixed to each of the stub sections of the original tubing.

For example, if a butt weld is employed, each end of the new, replacement section of tubing is placed over the chamfered end of a stub section of original tubing and a bead of brazing or welding material is then placed around the circumference of the joint. Alternatively, a fitting adapted to receive one end of the replacement tubing and the finished end of the stub section of original tubing is welded in place with a weldment extending about the outer circumference of the tubing.

The problem with the technique described above, and similar techniques for replacing a damaged section of piping or tubing, is that all of the operations performed require ready access to the tubing so that the tools involved can be manipulated to perform their respective functions. The cutting tool, for example, must be positionable against the outer surface of the wall of the tubing to cut therethrough. The deburring tool, chamfering tool and polishing tool must all be manipulated against the cut end of the stub sections of original tubing in order to perform their respective operations. The acetylene torch or other means for heating the welding or brazing material must also be freely manipulable in the area of the joint between the stub sections of original tubing and the replacement sections.

In some applications, access to the tubing for performing any of the operations described above is difficult, if not impossible, using prior art tools and techniques. For example, the tubing employed in the turbine of a jet engine for carrying lubrication, coolant, fuel or instrumentation cannot be directly accessed except through an opening in the turbine case without disassembling the turbine. Disassembly of the turbine is a difficult operation involving a substantial amount of maintenance time and expense.

SUMMARY OF THE INVENTION

It is therefore among the objectives of this invention to provide a method and apparatus for the replacement of discrete sections of damaged or defective tubing from a length of original tubing which can be employed where the tubing is located in areas difficult to access, which substantially reduces the time and expense involved in the replacement of such tubing and which produces a reliable joint between the replacement section of tubing and the original tubing.

These objectives are accomplished in a method and apparatus for replacing a section of tubing located in a structure in which limited area is available to gain access to the tubing, which comprises inserting a cutter mounted to one end of a flexible shaft into the hollow interior of the original tubing to a location spaced from the section of tubing to be removed. The flexible shaft is rotated so that the cutter engages the inner surface of the tubing wall and cuts outwardly through the wall to its outer surface permitting removal of the section of damaged tubing while leaving a stub section of original tubing in place. A chamfering tool mounted at the end of an elongated shaft is then fitted onto the cut end of the stub section of original tubing and rotated to remove burrs from both the inner and outer diameter thereof, and to form chamfers extending from the end of the tubing along both the inner surface and outer surface of its wall. Any remaining burrs or surface irregularities on the outer surface of the wall of the stub section of original tubing are removed by a deburring tool, mounted at the end of an elongated shaft, which is formed with a cutting blade adapted to contact the outer surface of the stub section. A buffing or polishing tool mounted to an elongated shaft is then fitted onto the outer surface of the stub section to prepare it for brazing or welding.

The new, replacement section of tubing, having a hollow mounting sleeve welded to one end, is then connected to the stub section of original tubing by first inserting the stub section into the mounting sleeve so that its end edge abuts a brazing ring or welding ring carried within the interior of the mounting sleeve against the end edge of the replacement section of tubing. The elongated nozzle of an acetylene torch is inserted into the replacement section of tubing, at or near the area of the mounting sleeve, where it melts the brazing ring or welding ring to form a permanent connection between the replacement section of tubing, the mounting sleeve and the stub section of original tubing.

An important aspect of this invention is that the cutting operation, and each operation associated with the preparation of the stub sections of original tubing for welding or brazing, are carried out in an area of limited access where prior art tools could not be employed. The cutting tool, chamfering tool, deburring tool, polishing tool and the nozzle of the acetylene torch are all elongated, or mounted at the end of an elongated shaft, for insertion through an access opening in the structure within which the tubing is located. In the particular application of replacing tubing carrying lubrication oil, coolant, fuel or instrumentation from the turbine case of a jet engine, each of the aforementioned tools is inserted through an access opening in the turbine case and into contact with the tubing. This tubing would be inaccessible using prior art tools and techniques unless the turbine was disassembled. The tools and method of this invention therefore permit replacement of such tubing without disassembly of the turbine case, and in a minimal amount of time.

In a more specific aspect of this invention, the cutting tool herein comprises a carbide cutter in the shape of a truncated cone having an annular cutting edge formed with a plurality of serrated teeth. The carbide cutter is mounted at one end of a flexible, wound steel spring shaft. The other end of the flexible shaft is mounted in the chuck of a drill or any other suitable means of rotating the shaft. In the presently preferred embodiment, the flexible shaft is bent at an angle of approximately 20° about one inch from the carbide cutter. The carbide cutter is angled relative o the longitudinal axis of the flexible shaft so that upon insertion of the flexible shaft and cutter within a hollow pipe or tube, a section or group of the cutting teeth of the cutting edge of the carbide cutter are forced against the inner surface of the wall of the tube. These teeth perform the cut when the flexible shaft is rotated. If desired, the flexible shaft can thereafter be bent in the opposite direction so the another group of teeth on the cutting edge of the cutter can be used to perform subsequent cuts.

Once the damaged section of tubing is cut and removed from the length of original tubing, the stub sections of original tubing which remain must be prepared for attachment to a new, replacement section of tubing. The first step in this process is performed by a chamfering tool which comprises a cylindrical body having an outer wall and opposed ends. One end of the cylindrical body is adapted to mount to an elongated shaft driven by a drill or the like, and the opposite end of the cylindrical body is formed with an inner chamfering portion and an outer chamfering portion. The inner chamfering portion of the chamfering tool extends inwardly from the end edge of the cylindrical body and consists of a plurality of circumferentially spaced, serrated teeth. The diameter of the inner chamfering portion increases from the end edge of the cylindrical body axially inwardly, so that the inner chamfering section is formed in the shape of a truncated cone.

The outer chamfering section of the chamfering tool comprises a plurality of circumferentially spaced, serrated teeth which extend axially inwardly from the outer wall of the cylindrical body at its end edge to the inner chamfering portion. The diameter of the outer chamfering portion decreases from the end edge of the cylindrical body axially inwardly so that the serrated teeth of the outer chamfering section are tapered in the opposite direction from the serrated teeth of the inner chamfering section.

The chamfering tool engages the end of the stub section of original tubing such that the inner chamfering portion extends into the interior of the stub section and contacts the inner surface of its wall, and the outer chamfering portion contacts the outer surface of the stub section. The chamfering tool removes burrs from the inner and outer diameter of the stub section, and also forms a 45° chamfer extending from the end of the stub section to both the inner surface and the outer surface of the wall thereof.

The next step in the tube replacement operation is to prepare the outer wall of the stub section of original tubing for welding or brazing to the new, replacement section of tubing. First, a deburring tool is provided which comprises a hollow cylinder mounted to an elongated shaft and having a carbide cutting blade extending into the interior of the cylinder and axially along at least a portion of the length thereof. The hollow cylinder of the deburring tool is placed over the end of the stub section of original tubing such that the carbide cutting blade engages the outer surface of the wall of the tubing, and is then rotated by a drill or the like connected to its elongated shaft to remove any further burrs or other surface irregularities therefrom.

A polishing tool is then employed to provide a polished finish on the outer surface of the stub section of the original tubing in preparation for welding or brazing. The polishing tool comprises a hollow cylinder mounted to an elongated shaft having an inner surface coated with an abrasive material. The hollow cylinder is placed on the outer surface of the stub section and then rotated so that its abrasive coating forms a relatively smooth finish thereon.

In the presently preferred embodiment, the replacement section of tubing is permanently affixed to the stub section of original tubing by a mounting sleeve comprising a hollow sleeve body having a wall with inner and outer surfaces. The replacement tubing is received within the interior of the mounting sleeve and affixed thereto by a weldment extending circumferentially along the outer surface of the replacement tubing and one end of the mounting sleeve. A heat fusible ring such as a brazing ring is then inserted within the interior of the mounting sleeve into engagement with the end edge of the replacement tubing.

The mounting sleeve is then slid over the stub section of original tubing so that its end edge engages the brazing ring. The elongated nozzle of an acetylene torch is inserted into the replacement section of tubing to a point where the flame from the nozzle is located proximate the area of the mounting sleeve and brazing ring. The heat from the acetylene torch melts the brazing ring causing the brazing material to flow along the chamfered end of the stub section of original tubing and between its outer surface and the inner surface of the wall of the mounting sleeve. This forms a fluid-tight seal between the replacement section of tubing, the stub section of original tubing and the mounting sleeve.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a partial, elevational view of the tubing cutter of this invention;

FIG. 1A is a view of the cutter of FIG. 1 inserted within a section of tubing in a position to perform a cut;

FIG. 2 is an isometric view of the chamfering tool of this invention;

FIG. 2A is a view of the chamfering tool of FIG. 2 shown in an operating position on the end of a cut section of tubing;

FIG. 3 is an isometric view of the deburring tool herein;

FIG. 3A is a view of the deburring tool in an operating position on a cut section of tubing;

FIG. 4 is an isometric view of the polishing tool of this invention;

FIG. 4A is the polishing tool of FIG. 4 shown in an operating position on a cut section of tubing;

DETAILED DESCRIPTION OF THE INVENTION

Figure 5:
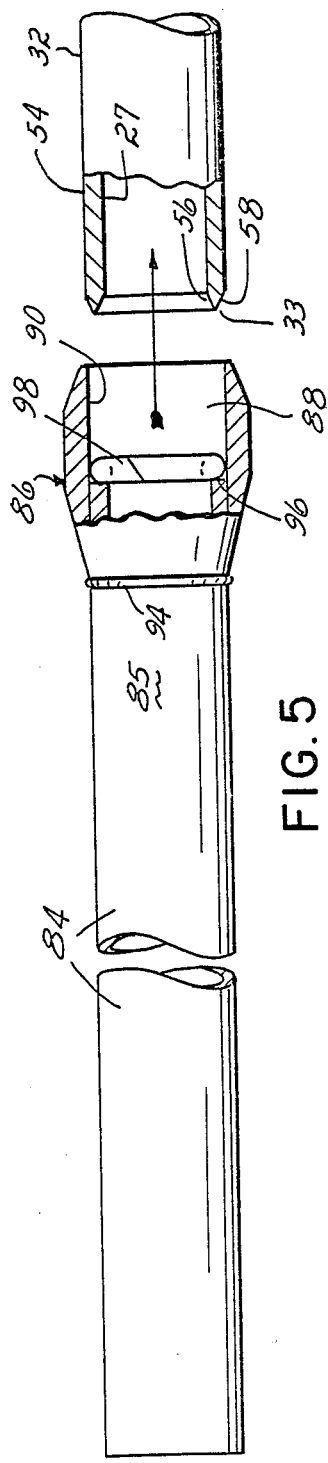
FIG. 5 is an elevational view in partial cross section of the mounting sleeve of this invention connected to a replacement section of tubing, and in a position prior to connection to the original, cut section of tubing.

Referring now to the FIGS., a number of tools are illustrated for removing a damaged or defective section of a cylindrical member such as piping or tubing from a longer length of same, and then replacing the defective section of tubing with a new section of tubing. The tools and their method of operation described below are particularly adapted for the replacement of tubing located within an area of a structure which is difficult to access. For example, it is contemplated that one use of the tools herein is for the replacement of damaged sections of tubing carrying lubricating oil, coolant, fuel and/or instrumentation in the turbine of a jet engine, where such tubing must be accessed through an opening formed in the turbine case (not shown). It should be understood, however, that the tools and method of their operation described below could also be employed in a variety of other applications.

Referring now to FIGS. 1 and 1A, a cutter 10 comprises a carbide cutting tip 12 which is mounted to a steel spring wound flexible shaft 14. The cutting tip 12 is preferably in the shape of a truncated cone having one end brazed or welded to the flexible shaft 14 and the opposite end formed with an annular cutting edge 16 having a plurality of serrated teeth 18. In the presently preferred embodiment, the flexible shaft 14 is formed with a bend 20 approximately one inch from the cutting tip 12 forming an end portion 22 of the flexible shaft 14 which is disposed at an angle of approximately 20° relative to the longitudinal axis of the remainder of the flexible shaft 14.

The flexible shaft 14 and cutting tip 12 are insertable within the hollow interior 24 of a cylindrical member such as a length of tubing 26. See FIG. 1A. Assuming a portion 28 of the tubing 26 is defective or damaged, the flexible shaft 14 is advanced axially along the tubing 26 so that the cutting tip 12 is spaced from the damaged portion 28. The free end of the flexible shaft 14 is mounted to the chuck 30 of any suitable rotating device such as a drill 31 or the like, illustrated schematically in the FIGS., for rotation of the flexible shaft 14. Because of the bend 20 formed in the flexible shaft 14, a portion of the serrated teeth 18 of cutting tip 12 are forced against the inner surface 27 of the wall of tubing 26. Upon rotation of the flexible shaft 14, the serrated teeth which contact the inner surface 27 cut the tubing 26 from its inner surface 27 outwardly forming a stub section 32 of original tubing as shown in FIGS. 2A-4A. This stub section 32 of tubing remains in the structure, e.g., the turbine of a jet engine, and the damaged section 28 of the original tubing 26 is removed for replacement by a new section of tubing as described below.

It has been found that the bend 20 formed on the flexible shaft 14 effectively forces the cutting edge 16 of cutting tip 12 against the inner surface 27 of tubing 26 to ensure a relatively clean and even cut is made on the tubing 26. The steel spring material from which the flexible shaft 14 is constructed has the ability to hold the bend formed therein throughout the cutting operation. If desired, the flexible shaft 14 may be bent in the opposite direction after one section of tubing 26 is cut so that another group of serrated teeth 18 on the cutting edge 16 of cutting tip 12 can be employed in the next cutting operation. In this manner, the flexible shaft 14 and cutting tip 12 can be used for multiple cuts.

Referring now to FIGS. 2-4A, a group of tools and the method of their operation is illustrated which are used for preparing the stub section 32 of original tubing for welding or brazing to a new, replacement section of tubing. In the presently preferred embodiment, a chamfering tool 34 performs the initial operation on the cut stub section 32 of original tubing. See FIGS. 2, 2A. The chamfering tool 34 comprises a cylindrical body 36 having one end connected to an elongated shaft 38 mounted in the chuck 30 of the rotating device 31. The opposite end of cylindrical body 36 is formed with an inner chamfering portion 40 and an outer chamfering portion 42.

The inner chamfering portion 40 includes a plurality of circumferentially spaced, serrated teeth 44 which extend axially inwardly from the end edge 46 of the cylindrical body 36. The diameter of the inner chamfering portion 40 increases from the end edge 46 of cylindrical body 36 axially inwardly so that the serrated teeth 34 are tapered at an acute angle of about 45° relative to the longitudinal axis of the cylindrical body 36.

The outer chamfering portion 42 of chamfering tool 34 comprises a plurality of circumferentially spaced, serrated teeth 48 which extend axially inwardly from the outer wall 50 of cylindrical body 36 at its end edge 46 to the inner chamfering portion 40. The diameter of the outer chamfering portion 42 decreases from the end edge 46 of cylindrical body 36 to the inner chamfering portion 40 so that the serrated teeth 48 of outer chamfering portion 42 are tapered in the opposite direction relative to the serrated teeth 44 of inner chamfering portion 34 at an angle of about 45° with respect to the longitudinal axis of cylindrical body 36.

As shown in FIGS. 2A and 5, the chamfering tool 34 is placed onto the end 33 of stub section 32 such that the inner chamfering portion 40 extends within the interior of stub section 32 engaging the inner surface 27 of the wall of stub section 32, and the outer chamfering portion 42 extends exteriorly of the stub section 32 engaging the outer surface 54 of its wall. Rotation of the shaft 38 carrying the cylindrical body 36 of chamfering tool 34 causes the inner chamfering portion 40 to form a 45° chamfer 56 extending from the end 33 of stub section 32 to its inner surface 27, and the outer chamfering portion 42 forms a chamfer 58 extending from the end 33 of stub section 32 to the outer wall 54 thereof. See FIG. 5. In the course of forming chamfers 56, 58, the chamfering tool 34 removes any burrs formed on the inner diameter and outer diameter of the stub section 32 at its end 33.

Referring now to FIGS. 3 and 3A, a deburring tool 60 is illustrated which is used next in the sequence of preparing the stub section 32 for connection to a new, replacement section of tubing. The deburring tool 60 comprises a hollow cylinder 62 connected to an elongated shaft 64 which extends therethrough forming a pilot section 66 at the forward end of cylinder 62. At least one rectangular-shaped carbide cutter or blade 68 is embedded in the wall of cylinder 62 which extends axially therealong generally parallel to the shaft 64. A portion of the cutter 68 protrudes through the inner wall 70 of cylinder 62 as shown in FIG. 3.

The deburring tool 60 is positioned relative to the stub section 32 so that the pilot section 66 of the shaft 64 extends into the interior of stub section 32 and the cylinder 62 fits over its outer surface 54. The cutting blade 68 contacts the outer surface 54 of stub section 32 such that upon rotation of the cylinder 62 the cutting blade 68 removes any remaining burrs or other surface irregularities thereon.

The outer surface 54 of the wall of stub section 32 is finally prepared for welding or brazing by a polishing tool 72 illustrated in FIGS. 4 and 4A. The polishing tool 72 comprises a hollow cylinder 74 having an inner surface 76 coated with an abrasive material 78. The hollow cylinder 74 is connected to an elongated shaft 80 such that a pilot section 82 of the shaft 80 extends forwardly of the hollow cylinder 74. The polishing tool 72 is positioned relative to the stub section 32 of original tubing such that the pilot 82 of shaft 80 extends into the interior of the stub section 32 and the inner surface 76 of hollow cylinder 74 contacts the outer surface 54 of stub section 32. Rotation of the hollow cylinder 74 relative to the stub section 32 causes the abrasive material 78 on the inner surface 76 of cylinder 74 to polish the outer surface 54 of stub section 32 in preparation for brazing or welding.

Figure 6:
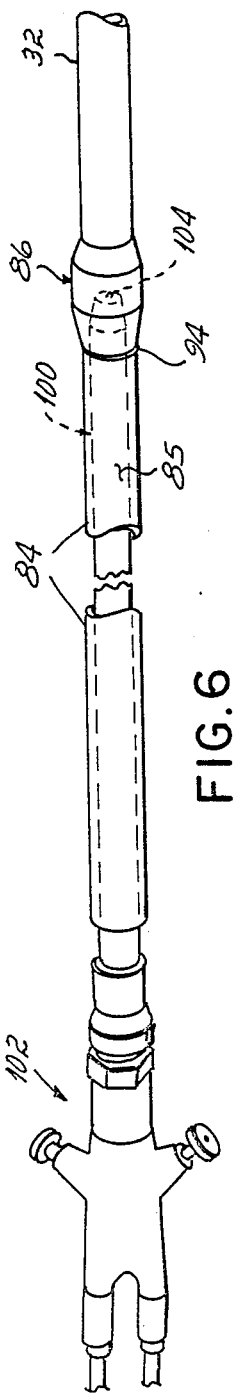
FIG. 6 is an isometric view of an acetylene torch having an elongated nozzle inserted within the interior of the replacement section of tubing shown in FIG. 5 in the vicinity of the mounting sleeve.
Figure 7:
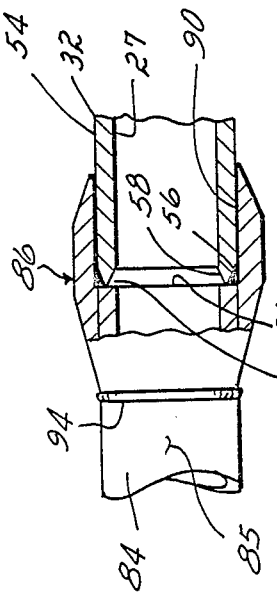
FIG. 7 is a cross sectional view of the welded or brazed connection between the replacement section of tubing, mounting sleeve and original cut section of tubing.

Referring now to FIGS. 5-7, the operations for mounting a section of replacement tubing 84 to the stub section 32 are illustrated. A generally cylindrical-shaped mounting sleeve 86 is provided which is formed with a hollow interior 88 defining an inner surface 90. One end of the mounting sleeve 86 is fitted over the outer wall 85 of the replacement tubing 84 where it is fixedly mounted by brazing or welding as depicted by a circumferential weldment 94. The end edge 96 of replacement tubing 84 is positioned approximately midway along the inner surface 90 of the mounting sleeve 86.

A heat fusible ring such as a welding ring or brazing ring 98 is then inserted within the interior 88 of mounting sleeve 86 into engagement with the end edge 96 of the replacement tubing 84. The brazing ring 98 is dimensioned to frictionally engage the inner surface 90 of mounting sleeve 86 to retain it tightly in place against the end edge 96 of replacement tubing 84.

In order to connect the replacement tubing 84 and mounting sleeve 86 to the stub section 32, the mounting sleeve 86 is first slid onto the outer surface 54 of stub section 32 until the end 33 of stub section 32 engages the brazing ring 98. In the presently preferred embodiment, the inner diameter of mounting sleeve 86 is slightly larger than the outer diameter of stub section 32 forming a gap therebetween for purposes to become apparent below.

With the replacement tubing 84 and mounting sleeve 86 positioned on the stub section 32, the elongated nozzle 100 of an acetylene torch 102 is inserted into the replacement tubing 84 to a position wherein the flame from the discharge opening 104 of the nozzle 100 is located in the area of the mounting sleeve 86. The application of heat by the torch 102 in the area of the mounting sleeve 86 melts the brazing ring 98 causing the brazing material to flow between the chamfer 58 on the end 33 of stub section 32 and the end edge 96 of replacement tubing 84, and also in the gap between the inner wall 90 of mounting sleeve 86 and the outer surface 54 of stub section 32. As illustrated in FIG. 7, the brazing material flows to the end of mounting sleeve 86 around the circumference of the outer surface 54 of stub section 32 indicating that a fluid-tight joint has been formed therebetween.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. A method of replacing a damaged or defective section of a length of hollow, original tubing with a new, replacement section of tubing, comprising:

inserting a cutter mounted to one end of a flexible shaft into the interior of a length of original tubing at a location spaced from a damaged or defective section of said original tubing to be replaced, and rotating said flexible shaft so that the cutting edge of said cutter contacts the inner surface of the wall of said original tubing and cuts through said wall to the exterior surface thereof;

removing the damaged or defective section of tubing after cutting said original tubing leaving at least one stub section of original tubing remaining;

positioning a chamfering tool onto the end of said stub section of original tubing and rotating said chamfering tool, said chamfering tool having an inner chamfering portion adapted to contact said inner surface of said wall of said stub section to form a chamfer thereat and an outer chamfering portion adapted to contact said outer surface of said wall of said stub section to form a chamfer thereat;

positioning a buffing tool onto said end of said stub section of original tubing and rotating said buffing tool, said buffing tool having an abrasive surface which contacts said outer surface of said wall of said stub section of original tubing to polish said outer surface;

inserting one end of a section of replacement tubing within the hollow interior of a mounting sleeve and brazing or welding said mounting sleeve onto the outer surface of the wall of said section of replacement tubing;

inserting a brazing ring into said hollow interior of said connector sleeve and against the end edge of said section of replacement tubing therein;

positioning said mounting sleeve and said replacement section of tubing relative to said stub section of original tubing so that said connector sleeve fits over a portion of said outer surface of said stub section and said brazing ring contacts the end edge of said stub section of original tubing;

inserting the elongated nozzle of an acetylene torch into the interior of said replacement section of tubing so that the tip of said elongated nozzle is positioned in the vicinity of said brazing ring, and heating said brazing ring to form a brazed joint between said end of said replacement section of tubing, said end of said stub section of original tubing and said connector sleeve.

2. The method of claim 1 further including the step of positioning a deburring tool having a carbide cutting blade onto said outer surface of said wall of said stub section of original tubing and rotating said deburring tool so that said carbide cutting blade removes burrs and any other projections from said outer surface of said stub section.

3. The method of claim 1 in which said step of inserting said cutter further comprises bending said flexible shaft at a point spaced from said cutter to position said cutter at an angle relative to the longitudinal axis of said flexible shaft, at least a portion of said cutting edge of said cutter thereby being forced into contact with said inner surface of said wall of said original tube upon insertion of said cutter and flexible shaft therein.

* * * * *